United States Patent Office 3,465,025
Patented Sept. 2, 1969

3,465,025
PROCESS FOR THE PREPARATION
OF ISOCYANATES
Arthur M. Brownstein, Morristown, and John V. Pascale,
Parsippany, N.J., assignors to Allied Chemical Corporation, New York, N.Y., a corporation of New York
No Drawing. Filed Nov. 17, 1966, Ser. No. 595,015
Int. Cl. C07c 119/04, 127/00
U.S. Cl. 260—453                                    7 Claims

ABSTRACT OF THE DISCLOSURE

A process for the preparation of aromatic mono- and di-isocyanates comprising reacting an N-mono-substituted aromatic mono- or di-urea with an oxide of nitrogen in an inert solvent at a temperature from about −70° C. to about 25° C. and recovering the isocyanate reaction product.

---

This invention relates to a process for the preparation of aromatic isocyanates. More particularly, this invention relates to a process for the preparation of aromatic mono- and di-isocyanates by nitrosation of the corresponding ureas with an oxide of nitrogen.

The preparation of isocyanates from substituted ureas by nitrosation with sodium nitrite in aqueous acid solution to form an N-nitrosourea, which on heating yields isocyanate, is known and can be illustrated by the following equations:

(1) 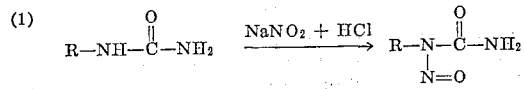

(2) 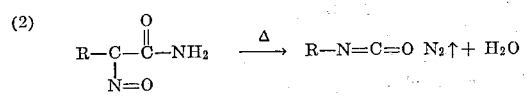

In practice, however, the yields from this process are generally very low. The low yields are due to hydrolysis of the isocyanate as soon as it is formed according to the following reaction:

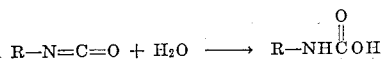

A large amount of water is always present since it is needed to dissolve the sodium nitrite. The presence of a strong acid also lowers the amount of isocyanate actually recoverable from this reaction. Another disadvantage of this process is that, although urea and amines are inexpensive and readily available, sodium nitrite is relatively costly and is not recoverable from this process. The present invention, which utilizes an inert solvent system, avoids these difficulties.

It is a primary object of this invention to provide a novel and improved process for the preparation of aromatic isocyanates in good yield.

It is a further object of this invention to provide a novel and improved process for the preparation of aromatic isocyanates from readily available and inexpensive starting materials.

In accordance with this invention, we have discovered that aromatic isocyanates can be prepared in good yield and at low cost by reacting the corresponding urea with an oxide of nitrogen in an inert solvent. Our novel process is also advantageous in that it avoids the use of crorosive materials requiring expensive equipment. In addition, the process employs readily available starting materials and mild operating conditions.

In essence our process comprises reacting an aromatic mono- or di-urea with a nitrogen oxide in an inert solvent at room temperature or below. The term "aromatic" connotes mono- and di-nuclear aryl, alkaryl, and nitro, alkoxy, and halo aryl hydrocarbons. The N-nitrosourea which is thereby formed need not be isolated since it is unstable and spontaneously decomposes to form the desired isocyanate product. The isocyanate product thus formed is readily isolated from the reaction mixture by conventional methods.

Any oxide of nitrogen can be employed in our process, including nitrous oxide, nitric oxide, nitrogen dioxide, nitrogen trioxide, nitrogen tetroxide and nitrogen pentoxide.

Suitable ureas include 2,4-tolyldiurea, 2,6-tolyldiurea, 4,4′ - (diphenylmethane)diurea, 4,4′ - (diphenylisopropane)diurea, o-, m-, and p-tolylurea, phenylurea, α- and β-naphthylurea o-, m-, and p-phenyldiurea, o-, m-, and p-ethyl, propyl and butyl-phenylurea, o-, m-, and p-nitro, methoxy, ethoxy and chloro-phenyl and tolyl urea, and the like.

These ureas may be readily prepared by known methods as for example by reacting an amine with urea in solution as disclosed in Organic Synthesis, Coll. Vol. 1, 453 (1941).

Although equimolar amounts of nitrogen oxide and aromatic urea may be employed in our process, we have found that better yields are obtained when a substantial excess of nitrogen oxide is present. We therefore prefer that the nitrogen oxide/urea molar ratio be between about 5:1 and about 15:1. The sequence of addition of either reactant is not critical and the oxide may be added to the urea or the urea may be added to a solution of the oxide.

The solvent may be any solvent that is inert to the reactants and products and dissolves at least one of the reactants. Preferably, the solvent will dissolve the nitrogen oxide but it need not dissolve the urea also, which may be utiilzed as a slurry. It is desirable that the solvent be separable readily from the isocyanate product. Normally all that is required is that the solvent be moderately volatile.

Suitable solvents include aliphatic and aromatic hydrocarbons such as pentane, hexane, heptane, octane, cyclohexane, benzene, toluene, xylene, isopropyl benzene and the like; halogenated aliphatic and aromatic hydrocarbons such as chloroform, carbon tetrachloride, methylene chloride, dichloroethane, dichlorobenzene, and the like; and their nitro, nitrile, ether or sulfoxide-substituted derivatives such as nitromethane, nitrobenzene, acetonitrile, cyanobenzene, and the like; tetrahyrofuran, dioxane, diglyme, diethyl carbitol, dimethylsulfoxide, and the like.

The temperature during the reaction may range from room temperature, e.g., about 25° C., down to about −70° C. The preferred temperature is from about −10° C. down to about −30° C. Below about −30° C. nitration of the urea is a significant side reaction and decomposition of the nitrosourea is too slow. Above about −10° C. the evolution of gas caused by the very rapid decomposition of the nitrosourea to the isocyanate is too violent.

Although no catalyst is required in our process, higher yields are usually obtained when the reaction is carried out in the presence of an inorganic base catalyst which will generally be present as a slurry in the reaction solvent. Useful catalysts include alkali metal oxides, hydroxides and carbonates and alkaline earth metal oxides, hydroxides and carbonates. An equimolar amount of catalyst and nitrogen oxide is preferred, although an excess of the catalyst will not inhibit the reaction.

In the preferred embodiment of our invention, the nitrogen oxide employed is dissolved in cold solvent until its concentration is from about 1% to about 25% by weight. A mol equivalent amount of catalyst is added, the solution is cooled below about −10° C. and the urea is added slowly, care being taken to maintain the temperature of the reaction mixture below about −10° C. until the addition of urea and concomitant gas evolution is complete. The reaction mixture is then allowed to warm to room temperature, filtered and the solvent removed from the isocyanate product in any convenient manner such as by distillation.

The following examples will serve to further illustrate the process of the invention.

EXAMPLE 1

Preparation of 2,4-tolyldiisocyanate 0.15 mol of nitrogen tetroxide was added to 100 ml. of carbon tetrachloride and the solution cooled to −25° C. 0.0217 mol of 2,4-tolyldiurea was added slowly and the mixture stirred continuously until addition was complete. The mixture was then allowed to warm slowly to room temperature. Gas evolution commenced at about −18° C.

2,4-tolyldiisocyanate was obtained in 36% yield as determined by vapor phase chromatographic analysis of the reaction mixture.

EXAMPLE 2

2,4-tolyldiisocyanate was made using the process disclosed by Rossi et al., Chim. i. ind. (Milan), 42, 1243 (1960). 0.05 mol of 2,4-tolyldiurea was mixed with 26 ml. of xylene in a 250-ml. round-bottom flask. The mixture was cooled to 5° C. and a solution containing 0.11 mol of sodium nitrite in 15 ml. of water was stirred in. 15 milliliters of concentrated hydrochloric acid were added. A dark precipitate formed which was filtered off.

An 8.2% yield of 2,4-tolyldiisocyanate was recovered from the filtrate.

A comparison of Examples 1 and 2 indicates the improved yields of isocyanate obtainable by means of our process in comparison with those obtainable utilizing the processes of the prior art illustrated by Example 2.

EXAMPLE 3

0.15 mol of nitrogen tetroxide was added to 100 ml. of carbon tetrachloride and cooled to −20° C. 0.1 mol of sodium carbonate was stirred in and the mixture cooled to −30° C. 0.0135 mol of 2,4-tolyldiurea was added slowly and the temperature of the reaction solution allowed to rise to room temperature. When the evolution of gas was complete, the catalyst was filtered off and the solvent evaporated. A 54% yield of 2,4-tolyldiisocyanate was obtained in this system which employed a catalyst as determined by vapor phase chromatographic analysis of the residue.

EXAMPLE 4

The method described in Example 3 was followed except that 2 mols of calcium hydroxide were present for each mol of nitrogen dioxide present.

A yield of 49% of 2,4-tolyldiisocyanate was obtained. This example demonstrates that the ratio of catalyst to nitrogen oxide is not critical.

EXAMPLE 5

Reaction of 0.05 mol p-tolylurea with 0.6 mol nitrogen pentoxide, according to the procedure of Example 1, using 0.6 mol of calcium carbonate as the basic catalyst and dioxane as solvent, affords a 65% yield of p-tolyl isocyanate.

EXAMPLE 6

Reaction of 0.05 mol phenylurea with 0.5 mol nitrogen dioxide using nitrobenzene as solvent and 0.5 mol sodium hydroxide as catalyst affords a 71% yield of phenyl isocyanate. The structure of the product is confirmed by the presence of a strong infrared absorption peak at 2306 cm.$^{-1}$.

We claim:

1. A process for the preparation of aromatic mono- and di-isocyanates comprising reacting an N-mono-substituted aromatic mono- or di-urea with an oxide of nitrogen in an inert solvent at a temperature of from about −70° C. to about 25° C. and recovering the isocyanate reaction product, wherein said aromatic moiety is a member selected from the group consisting of unsubstituted, alkyl-substituted, nitro-substituted, alkoxy-substituted and halogen-substituted mono- and di-nuclear aryl hydrocarbon radicals.

2. A process according to claim 1 wherein said urea is reacted with an oxide of nitrogen in the presence of at least an equimolar amount of an inorganic base catalyst.

3. A process according to claim 1 wherein said temperature is from about −30° C. to about −10° C.

4. A process according to claim 1 wherein said oxide of nitrogen is selected from the group consisting of nitrogen dioxide and nitrogen tetroxide.

5. A process according to claim 2 wherein said inorganic base is selected from the group comprising alkali metal oxides, hydroxides and carbonates and alkaline-earth metal oxides, hydroxides and carbonates.

6. A process according to claim 2 wherein the mol ratio of the oxide of nitrogen to the inorganic base is unity and the mol ratio of the oxide of nitrogen to urea is between about 5 to 1 and about 15 to 1.

7. A process according to claim 1 wherein said urea is 2,4-tolyldiurea.

References Cited

UNITED STATES PATENTS 3,215,701  11/1965  Pomot _____ 260—553 XR

OTHER REFERENCES

Saunders et al.: Chemical Reviews, vol. 43, p. 207 relied upon (1947).

Boivin et al.: Canadian Journal of Chemistry, vol. 29, pp. 478–81 (1951).

CHARLES B. PARKER, Primary Examiner

D. H. TORRENCE, Assistant Examiner

U.S. Cl. X.R.

260—553